US008797465B2

(12) United States Patent  
Hardacker et al.

(10) Patent No.: US 8,797,465 B2  
(45) Date of Patent: Aug. 5, 2014

(54) APPLICATIONS FOR REMOTE CONTROL DEVICES WITH ADDED FUNCTIONALITIES (75) Inventors: Robert Hardacker, Escondido, CA (US); Steven Richman, San Diego, CA (US); Brant Candelore, Escondido, CA (US); Behram DaCosta, San Diego, CA (US); Peter Shintani, San Diego, AZ (US); Takaaki Ota, San Diego, CA (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 1564 days.

(21) Appl. No.: 11/801,165

(22) Filed: May 8, 2007

(65) Prior Publication Data

US 2008/0278635 A1 Nov. 13, 2008

(51) Int. Cl.  
*H04N 5/44* (2011.01)

(52) U.S. Cl.  
CPC ....................................... *H04N 5/44* (2013.01)  
USPC .......................................................... 348/734

(58) Field of Classification Search  
CPC .............................. H04N 5/44; H04N 5/4448  
USPC .......... 725/6, 109, 110, 133; 726/2, 4, 21, 27; 713/193; 348/734  
See application file for complete search history.

(56) References Cited

U.S. PATENT DOCUMENTS

| | | | |
|---|---|---|---|
| 5,778,077 A * | 7/1998 | Davidson ........................ 381/57 |
| 5,973,756 A | 10/1999 | Erlin | |
| 6,236,312 B1 | 5/2001 | Chitsazan et al. | |
| 6,543,052 B1 | 4/2003 | Ogasawara | |
| 6,654,721 B2 * | 11/2003 | Handelman ................... 704/270 |
| 6,868,292 B2 * | 3/2005 | Ficco et al. ..................... 700/19 |
| 6,940,986 B2 | 9/2005 | Belenger et al. | |
| 7,096,185 B2 | 8/2006 | Reichardt et al. | |
| 7,136,817 B2 | 11/2006 | Schroder et al. | |
| 7,434,067 B1 * | 10/2008 | Skinner ......................... 713/193 |
| 2002/0136414 A1 | 9/2002 | Jordan et al. | |
| 2002/0194587 A1 * | 12/2002 | Lampton et al. ................ 725/10 |
| 2005/0155073 A1 * | 7/2005 | Lecomte ......................... 725/96 |
| 2006/0041923 A1 | 2/2006 | McQuaide, Jr. | |
| 2008/0089658 A1 * | 4/2008 | Grady et al. .................... 386/46 |

FOREIGN PATENT DOCUMENTS

WO 02/085005 10/2002

* cited by examiner

*Primary Examiner* — Kiew Oanh T Bui  
(74) *Attorney, Agent, or Firm* — Sony Corporation (57) ABSTRACT

A handheld wireless device for controlling an electronic device. Ambient noise is automatically detected using a microphone and user preference parameters (e.g., volume) are adjusted, compensating for the detected noise. Plurality of signals are sent and received, operable to determine the location of the remote control, thereby operable to automatically tune various user preference parameters (e.g., surround sound). The remote control may be used as a telephone. When receiving a call, the caller information may be displayed using a popup window (e.g., on a television set). A call may be answered and the program may be paused/recorded/muted. The electronic device is automatically configured by identifying the user. A reader may read information on a payment card in a contactless manner. In one embodiment a radio frequency signal is used to reduce interference with LCD wavelength. The remote control may respond to a user command in order to be located.

42 Claims, 8 Drawing Sheets

APPLICATIONS FOR REMOTE CONTROL DEVICES WITH ADDED FUNCTIONALITIES

TECHNICAL FIELD

Embodiments of the present invention relate to the field of electronics. More particularly, embodiments of the present invention relate to the applications for remote control devices with added functionalities.

BACKGROUND ART

Increasing growth in technology and electronics has increased the number of electronic devices in recent years. In general, many electronic devices may be remotely controlled. For example, to name a few, a television set, a set-top-box, a receiver, a digital versatile disk (DVD), a game console and a stereo, may all be remotely controlled.

Remote controls in general require a user to initiate a command (e.g., increase the volume). Unfortunately, remote controls do not have the intelligence to automatically adjust various user preferences (e.g., volume) in order to compensate for external factors (e.g., ambient noise), effecting the user preference (e.g., volume level).

Similarly, remote controls do not have the intelligence to automatically adjust various parameters (e.g., volume, surround sound parameters and etc.) based on the location of the remote control. For example, if a user walks out of the room with a remote control, the volume for the television set is not adjusted. As a result, the user will be unable to hear the program on the television set. Similarly when a user changes position in the room, the parameters for the surround sound remain the same. As a result, the user may be unable to experience the full effect of the surround sound since various signals may now arrive at different times due to the change in user location.

Furthermore, remote controls currently fail to automatically adjust various user preference parameters based on the user identification. Therefore, adjusting various parameters requires each user to individually and manually adjust various parameters based on the user preference. For example, remote controls are incapable of identifying the user in order to automatically adjust the volume based on the user preference. Additionally, since remote controls are incapable of identifying the user, parents have to manually block channels for preventing minors from watching certain channels. Accordingly, adjusting various parameters (e.g., volume, blocking channels, surround sound and etc.) using conventional remote controls is tedious and requires complex manual steps to be taken by the user.

With increasing use of the Internet, television sets are now equipped with Internet Protocol (e.g., IPTV). Therefore, many users now surf the web using their television set. The user may wish to purchase an item online or order a movie. In general, this requires the user to manually take a credit card and enter the credit card number. The user may wish to keep the credit number private when other people are present. Unfortunately, conventional methods fail to provide a method for the user to keep the information private and require the user to manually enter the credit card number which may also be error prone. Alternatively, the system may require the user to slide the credit card on the remote if the remote control is equipped with magnetic reading mechanism. Unfortunately, the mentioned methods are tedious, error prone and may expose the privacy of the user.

Unfortunately, most remote controls only function as a remote control and are not configured for use as an integrated electronic device with added functionalities. For example, a wireless telephone and a remote control are separate from one another.

The development of new technologies like Liquid Crystal Display (LCD) has led to an increase in the quality of images on the display. Most remote controls use expensive Infrared (IR) technology to control electronic devices (e.g., television set). On occasion, IR technology interferes with the backlighting of the LCD screen due to its interference with white light emitting diode (LED) of the LCD.

Moreover, unfortunately conventional remote controls are not equipped with a mechanism such that the position of a remote control can be located in response to a user command. For example, if a remote control is lost (e.g., buried under a couch), there is currently no convenient method for locating the remote control without having to physically search for the remote control.

SUMMARY

Accordingly, a need has arisen to provision a remote control device with intelligence to automatically adjust various user preference parameters (e.g., volume) in order to compensate for external factors (e.g., ambient noise), effecting the user preference (e.g., volume level). Moreover, a need has arisen to provision a remote control with intelligence to automatically adjust various user preference parameters (e.g., volume, surround sound parameters and etc.) based on the location of the remote control and/or to automatically configure the electronic device based on the identification of the user.

It is advantageous to provide a method for providing a payment mechanism without revealing the user's private information (e.g., credit card number). Moreover, a need has arisen to provide a remote control operable to have added functionalities including a microphone (e.g., telephone, video conferencing, etc.) other than merely controlling the electronic device. Furthermore, a need has arisen to provide a remote control that can reduce interference with the wavelength of a display (e.g., LCD). It is also desired to locate a remote control in response to a user command (e.g., snap, voice command and etc.). It will become apparent to those skilled in the art in view of the detailed description of the present embodiments of the invention that the present invention remedy the above mentioned needs.

In one embodiment of the present invention, a remote control is operable to automatically detect ambient noise. Ambient noise may be detected using a microphone within the remote control. The ambient noise may be used to automatically determine the adjustment for various user preference parameters (e.g., volume) of a television in order to compensate for the detected noise and maintain the effective user preference parameters regardless of external factors. As a result, the various user preference parameters may be automatically adjusted in response to the remote control device detecting the ambient noise.

In one embodiment, the remote control may send and receive a signal. In response to the sent and received signal, the remote control may then determine the location of the remote control relative to the electronic device and its previous location. As a result, the remote control may then automatically adjust and tune various user preference parameters (e.g., surround sound), thereby providing the user with the full effect of user preference (e.g., surround sound). Accordingly, a need to manually tune and adjust the user preference parameters is eliminated.

According to one embodiment, the remote control may have a microphone and may be operable to be used as a telephone. For example, the remote control may use an audio output for receiving a phone call through an electronic device (e.g., television set). In one embodiment, the remote control may use the audio output from the electronic device (e.g., television set). Accordingly, when a call is received, a user may be notified by ringing or a popup window (e.g., on a television set) that may indicate receiving a call. In one embodiment, the information regarding the caller may be displayed. If the remote control is equipped with a display, the caller information may also be displayed in response to receiving a call. In response to the user choosing to answer the telephone call, the program being executed on the electronic device (e.g., television set) may be paused/recorded/muted. In telephone mode, the remote may be used to capture the user's voice. Speakers on the remote and/or the television may be used to render the caller's voice.

In one embodiment, the remote control may be equipped with a biometric unit for identifying the user (e.g., voice recognition, finger printing and etc.). Accordingly, the remote control may automatically configure the electronic device (e.g., television set) based on the user preference. As such, a need to manually alter the settings to configure the electronic device for each user is eliminated.

According to one embodiment, the remote control may be equipped with a reader that may detect and read information on a credit card or a prepayment card in a wireless and contactless manner. As a result, when the user is purchasing an item (e.g., movie, or an item online), the reader automatically reads the information once the remote control is within a given proximity of the payment card. The read information may then be used to automatically authorize the user to purchase the item without revealing the user identity or credit card information, thereby keeping the credit card number and other similar information private. In order to protect the private information, the information may be encrypted before transmission to the electronic device (e.g., television set).

In one embodiment, a radio frequency (RF) signal is used in order to prevent interference with the operation of the electronic device (e.g., LCD). Moreover, in one embodiment, the remote control is equipped with a microphone that in response to a user command (e.g., voice command, clap and etc.) outputs an audible noise (e.g., beep) or audio signal (e.g., "I am here") in order to facilitate location of the remote control.

More specifically, an embodiment of the present invention pertains to a handheld wireless device for controlling an electronic device including a processor; at least one input device operable to receive a user input operable to control the electronic device; an audio input device operable to receive an audio input, wherein output volume of the electronic device is automatically adjustable based on the audio input; an output device for outputting a signal operable to control the operation of the electronic device; and a transceiver operable to communicate with the electronic device.

In one embodiment the output device automatically transmits a signal and in response to the transmitted signal receives a signal from the electronic device, wherein the transmitted and the received signals automatically determine the location of the handheld wireless device. According to one embodiment, a surround sound system of the electronic device is automatically tuned in response to the determined location of the handheld wireless device. In one embodiment, the tuning is performed by the processor of the handheld wireless device.

In one embodiment, the audio input is ambient noise. The signal operable to control the operation of the electronic device may be a radio frequency signal. In one embodiment, the at least one input device comprises at least one of a plurality of soft key buttons, a plurality of mechanical buttons, a rotating input component, a sliding input component and a voice activation component. The handheld wireless device may further include an audio output device for outputting audio.

In one embodiment, the handheld wireless device is operable to function as a wireless telephone, and wherein the handheld wireless device is operable to receive calls through and in conjunction with the electronic device. The handheld wireless device may be operable to receive calls through the electronic device. The audio output from a caller may be through an output device of the electronic device. In one embodiment, the information related to a caller is displayed on a display of the electronic device. In response connecting a telephone call, execution of an application on the electronic device may be paused/muted/recorded.

According to one embodiment, the audio input device may be a microphone. In one embodiment, the handheld wireless device may further include a biometric device, operable to identify a user of the handheld wireless device, wherein the handheld wireless device causes automatic configuration of the electronic device based on a preference of the user.

In one embodiment, the handheld wireless device may include a reader, operable to contactlessly detect and read a card payment. According to one embodiment, the handheld wireless device may also include an encryption/decryption unit, operable to encrypt and decrypt input and output data. The handheld wireless device may also include a display, operable to display content and information. In accordance with one embodiment, the handheld device in response to the audio input outputs an audible noise, wherein the audio input is a user command for locating the handheld wireless device.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "receiving" or "outputting" or "adjusting" or "sending" or "tuning" or "pausing" or "muting" or "recording" or "displaying" or "connecting" or "identifying" or "configuring" or "reading" or "transmitting" or "encrypting/decrypting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Applications for Remote Control Devices with Added Functionalities

Figure 1:
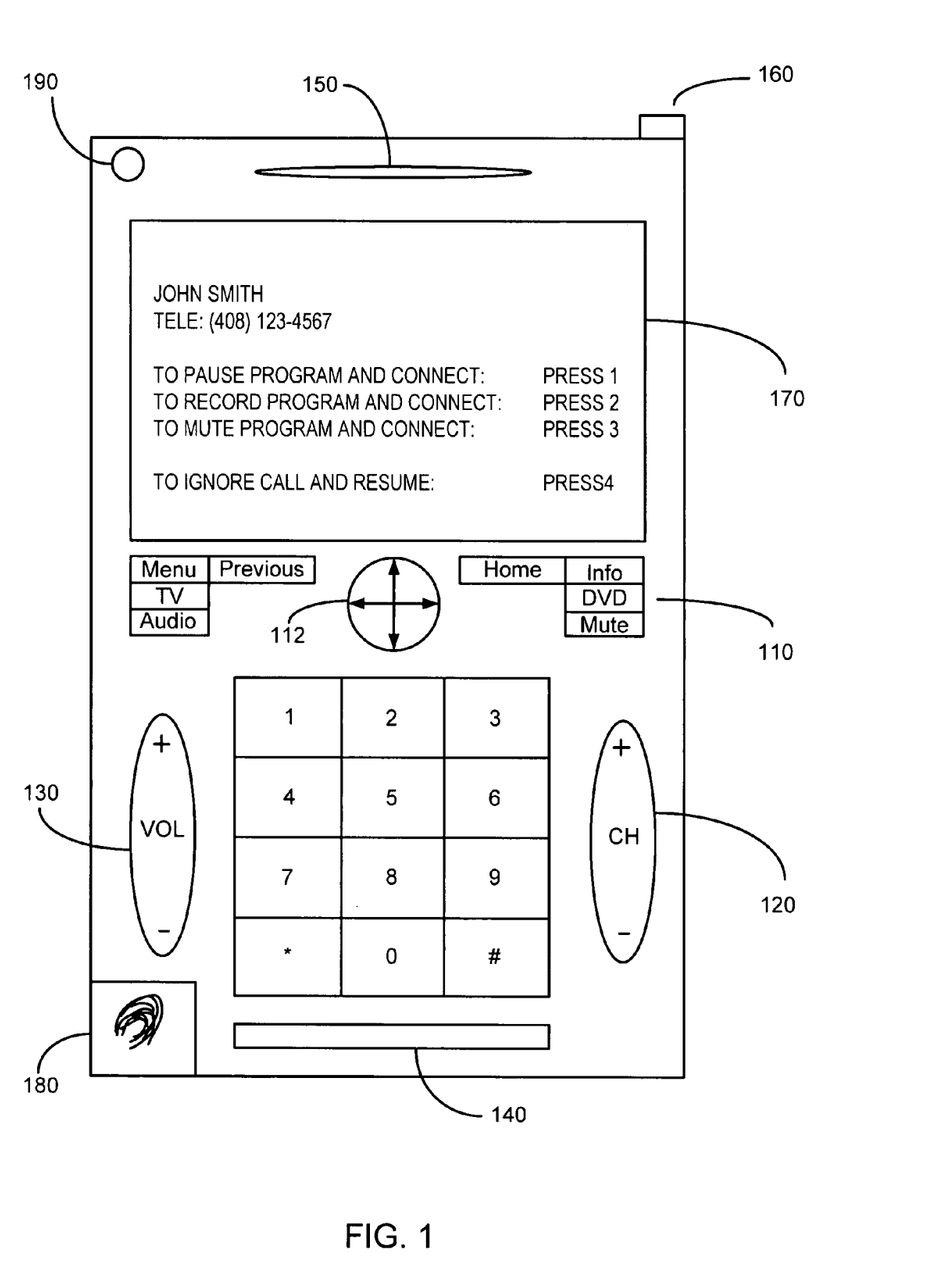
FIG. 1 shows an exemplary remote control device in accordance with one embodiment of the present invention.

Referring now to FIG. 1, an exemplary remote control device 100 in accordance with one embodiment of the present invention is shown. The remote control 100 may comprise a plurality of buttons 110, a dedicated button 120 for controlling the channel, a dedicated button 130 for controlling the volume, an audio input device 140, an audio output device 150, a transceiver 160, a display 170, a biometric unit 180 and an on/off button 190 to activate various electronic devices.

According to one embodiment, the plurality of buttons 110 is operable to control the operation of an electronic device (e.g., television set or a set-top-box). It is appreciated that the controlled electronic device may be any device, such as a television set, a set-top-box, a receiver, a digital versatile disk (DVD) and a stereo, to name a few. It is further appreciated that the embodiments of the present invention are discussed in terms of a television set. However, describing the embodiments of the present invention in terms of a television set is exemplary and should not be construed as limiting the scope of the present invention.

According to one embodiment of the present invention, the plurality of buttons 110 may comprise at least one or any combination of mechanical or capacitive sensing buttons (e.g., key pads), soft buttons (e.g., using a touch screen), rotating buttons (e.g., volume control) and sliding buttons (e.g., volume control), to name a few. In this example, the plurality of buttons 110 may be used to select controlling a DVD player, a television set or an audio output, to name a few.

Moreover, the plurality of buttons 110 may comprise a navigation button 112 operable to navigate an on-screen images, for instance, through various options. In one embodiment, the television set is an Internet Protocol television set (IPTV). Accordingly, the buttons (e.g., home button, previous button and etc.) may be used to browse the Internet, place a telephone call, receive a telephone call, perform a video conferencing service, etc., to name a few.

In one embodiment, the remote control 100 may use the dedicated channel button 120 for changing channels. Moreover, the dedicated volume button 130 may be used to increase/decrease the audio output volume. According to one embodiment, the audio input device 140 is a microphone. The audio output device 150 may be a speaker, operable to output audio on the remote control. For example, the speaker 150 may be used to facilitate a surround sound system with other speakers.

The transceiver 160 may be an antenna or other similar means enabling communication of the remote control device 100 with other electronic devices (e.g., television set, set-top-box, receiver and etc.). The transceiver 160 may use an Infrared (IR) signal to communicate with electronic device. According to one embodiment, the transceiver 160 may use radio frequency signals (RF) instead of Infrared (IR) to communicate with electronic devices in order to reduce signal interfaces (e.g., within an LCD television).

According to one embodiment, the remote control 100 comprises the display 170. It is appreciated that even though the display 170 is shown to occupy only a portion of the remote control 100, it may occupy any portion of the remote control. As such, the display 170 may be used to display content and information while it may also provide for a touch screen input mechanism (e.g., soft buttons). As such, the size of the display 170 is exemplary and should not be construed as limiting the scope of the present invention.

In one embodiment, the remote control 100 is operable to receive a telephone call through and/or in conjunction with the television set. As such, when a call is received, caller identification may be displayed using the display 170. In one embodiment, the caller identification may also or alternatively be displayed on the television set as a pop-up window. In this example, however, the caller identification is displayed by the remote control. Therefore, the user is notified that John Smith at (408) 123-4567 is calling.

In response to the telephone call, the remote control 100 may also display various options to the user. For example, the remote control 100 may allow the user to pause the program on the television set and answer the call by pressing 1. Similarly, the remote control 100 may allow the user to record the program on the television set and answer the call by pressing 2. Alternatively, the remote control 100 enables the user to automatically mute the program on the television set and connect the telephone call by pressing 3. Moreover, the remote control 100 may allow the user to ignore the telephone call and resume watching television by pressing 4 or simply by not pressing any buttons.

It is appreciated that the options presented to the user are exemplary and should not be construed as limiting the scope of the present invention. Accordingly, any combination may be presented to the user for selection or a default selection may be used.

The biometric device 180 may be used to identify the user of the remote control 100. In this exemplary embodiment, the biometric unit 180 may be a finger printing mechanism. However, it is appreciated that other means to identify the user may be employed. For example, the biometric device 180 may be a voice recognition device. As a result, the microphone 140 may receive audio input from the user. In response to this audio input, the remote control 100 may identify the user based on a stored voice pattern.

In one embodiment, in response to the identification of the user, the remote control may automatically configure the television set parameters based on the user preference that may have been indicated previously for the recognized user. As such, the configuration based on the user preference is performed automatically and dynamically. As a result, changing the remote from one user to another configures the television set automatically and on-the-fly without further action by the user.

According to one embodiment, the identification of the user may be used to block certain channels as a parental guide. For example, parents may set the television to block certain channels for users other than themselves. As a result, once a child is using the remote control, the remote control identifies the child and blocks the channels based on the stored parental guide settings.

Figure 2:
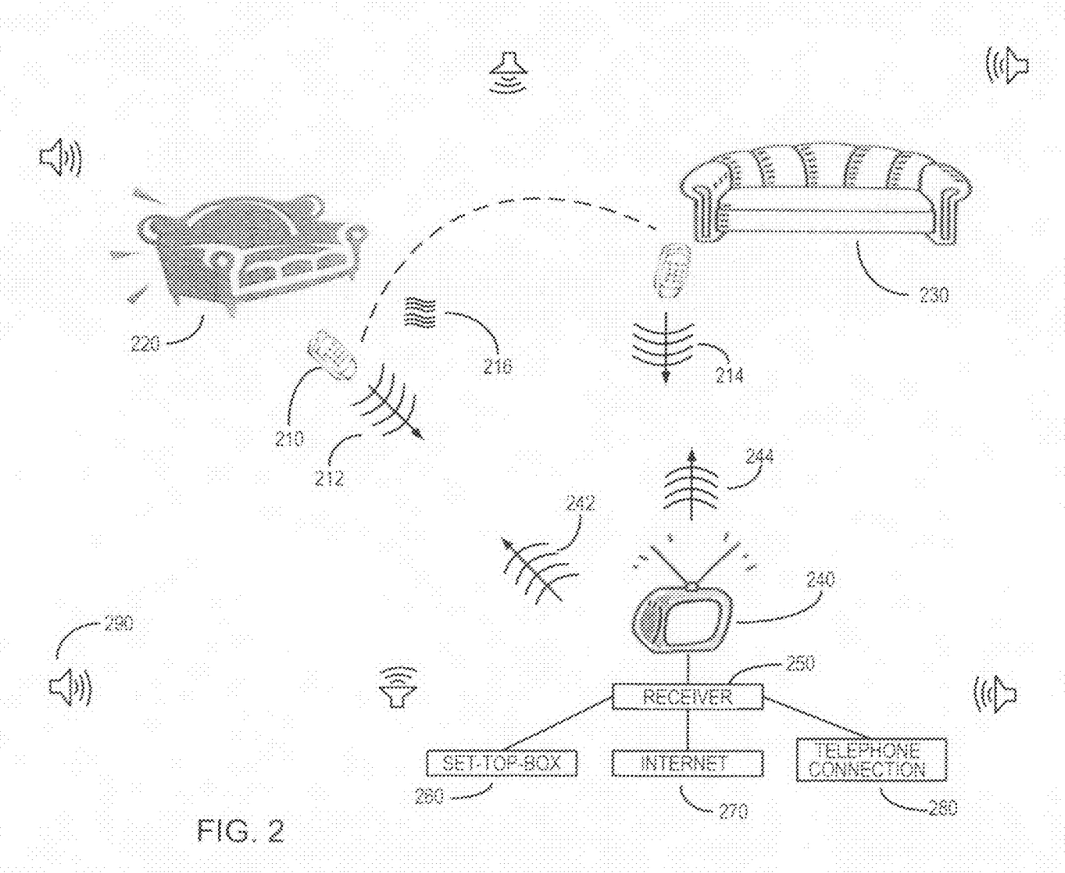
FIG. 2 shows an exemplary system for automatically adjusting user preference parameters in accordance with one embodiment of the present invention.

Referring now to FIG. 2, an exemplary system 200 for automatically adjusting user preference parameters in accordance with one embodiment of the present invention is shown. The exemplary system 200 shows a remote control 210 in communication with a television set 240. In this example, the user is moving from location 220 to location 230 with the remote control. According to this example, the television set 240 is coupled to a receiver 250, a set-top-box 260, an Internet connection 270 and a telephone connection 280.

It is appreciated that the Internet connection 270 may be used to provide Internet Protocol television set (IPTV). Moreover, it is appreciated that a telephone connection 280 may be used to provide a telephone connection capability to the remote control 210 and the television set 240. In one embodiment, a telephone connection may be provided through the Internet 270 using Voice over Internet Protocol (VoIP), plain old telephone service, video calls or any combination thereof, to name a few.

It is appreciated that the television set 240 is also coupled to a surround sound system 290 for outputting surround sound. It is appreciated that the television set 240 may be further coupled to other electronic devices. It is therefore appreciated that the connections shown in FIG. 2 are exemplary and should not be construed as limiting the scope of the present invention. For example, the surround sound may simply be a stereo output.

According to one embodiment of the present invention, the remote 210 may receive a plurality of audio input signals 216. The plurality of audio input signals 216 are received using a microphone. The plurality of audio input signals 216 may be ambient noise. For example, when a television set is on and when guests are present, the ambient noise generated may increase. In one embodiment, the ambient noise may include white noise, pink noise, discrete tones, typically octave or ⅓ octave, spanning the audio range or any combination thereof, to name a few.

The remote control 210 may capture and determine the amount of ambient noise 216. According to one embodiment, the determination of the amount of ambient noise 216 can be used to automatically calculate the required increase/decrease in audio volume to compensate for the ambient noise 216 such that effective volume level is adaptively maintained regardless of the amount of noise in the room. Volume adjustments can be automatically transmitted to the receiver. Adjusting the volume may be known as stereo imaging.

It is appreciated that according to one embodiment, the determination to increase/decrease the volume of the television set may be automatically performed by the remote control 210. However, the remote control 210 may also send the captured and determined amount of ambient noise 216 to the television set 240. As such, the amount of volume adjustment may be calculated by the television set or other electronic devices (e.g., set-top-box 260, receiver 250 and etc.).

Referring still to FIG. 2, the remote control 210 may transmit a plurality of signals 212 automatically. In response to the plurality of sent signals 212, the receiver 250 or the television set 240 may send a plurality of signals 242. Using the sent 212 and the received signal 242, the remote control 210 may automatically calculate and determine the location of the remote control 210 relative to the television set 240 and in comparison to its prior location.

For example, in one embodiment the remote control 210 may determine the delay of the signal and as a result calculate the distance between the remote control 210 and the television set 240 and/or the location of the remote with respect to the room. Moreover, the remote control 210 may use directional signals in order to determine the height and direction of the signal in order to determine the orientation and the exact position of the remote control 210. Furthermore, the remote control 210 may use high and low frequency signals and their delay in order to determine the remote's location and the optimization parameters for the surround sound 290 based on this location. It is appreciated that a similar method may be used to adjust the stereo volume.

According to one embodiment, no further action is taken by the remote control 210 when it is determined that the remote control 210 is in the location for which the surround sound 290 was optimized and configured. On the other hand, once the remote control 210 moves from location 220 to location 230, a second set of signals 214 is sent to the television set 240 and a second set of signals 244 is received from the television set.

Similar to before, the remote control 210 may again determine the delay and direction of the signal. As a result, the location of the remote control 210 and user is determined. Since the remote control 210 is moved from the location which the surround sound 290 was initially configured and optimized for, the remote control 210 automatically determines that the surround sound 290 is no longer optimized based on the location of the remote control. As a result, the remote control 210 may automatically tune the surround sound 290 in order to provide the user with the full effect of the surround sound 290 for the new location.

In one embodiment, the remote control 210 may send a signal to the television set 240 indicating that the surround sound 290 is no longer optimized and configured. In response to this indication, the television set 240 may automatically tune the surround sound 290 based on the parameters provided by the remote control 210. As a result, a user moving with a remote control automatically tunes the preference parameters and optimizes the parameters without further action by the user.

According to one embodiment, the volume on the audio output of the remote control 210 and/or audio output of the television set and the surround sound may be adjusted to compensate for a user moving closer or farther from the television set 240 and/or the surround sound 290. Similar to the methods described above, the location of the remote control 210 may be determined periodically. Alternatively, the audio output of the television set 240 and the surround sound 290 may be captured by the microphone of the remote control 210 in order to determine the received level of audio by the remote control. In response to this determination, the remote control 210 may increase/decrease the volume in order to compensate for the user becoming closer or farther from the audio output of the television set 240 and the surround sound 290.

Referring still to FIG. 2, it is appreciated that a biometric device of the remote control 210 may be used in order to identify the user. For example, a finger printing mechanism and/or a voice recognition mechanism may be used.

According to one embodiment, once the identity of the user is determined, the user preference configuration as previously determined by the user may be used. For example, upon determining the identity of user A, the remote control 210 may use the settings as initially specified by user A. For example, the settings may have configured the surround sound 290 at location 220. Accordingly, each time user A is identified the configuration parameters for the surround sound 290 at location 220 may be used. However, as described above, in response to changing the location of the remote control 210, the configuration may automatically be adjusted on-the-fly. In contrast, user B may have a setting for the surround sound 290 at location 230. Therefore, each time user B is identified, the configuration parameters for the surround sound 290 at location 230 may be used. Moreover, each user may have indicated a user preference (e.g., volume) to be used. As such, upon identifying the user, the user preference (e.g., volume level) may automatically be used.

Moreover, the biometric information may be used to configure additional options. For example, parents may block certain channels for everyone other than themselves. Accordingly, upon identifying that a child is using the remote control 210, the television set 240 is configured such that those channels as specified by the parents are blocked.

Therefore, the remote control 210 may be used to identify the user and automatically configure the electronic device (e.g., the television set 240 or receiver) based on the user preference. For example, based on the identity of the user, the remote control 210 may determine the desired audio volume, equalization, and surround sound 290 versus television set 240 speakers, based on the user preference, to name a few.

According to one embodiment, the remote control includes an audio output device. As a result, the remote control may respond to a user command indicating that the user is searching for the remote by outputting an audible noise (e.g., beep, audio output, etc.). In one embodiment, the remote control may beep in response to the user snapping. Similarly, in one embodiment, the remote control may output an audio message "here I am" in response to the user voice command "where is the remote?" Accordingly, the remote control may be located by the user without having to physically search for the device.

Figure 3:
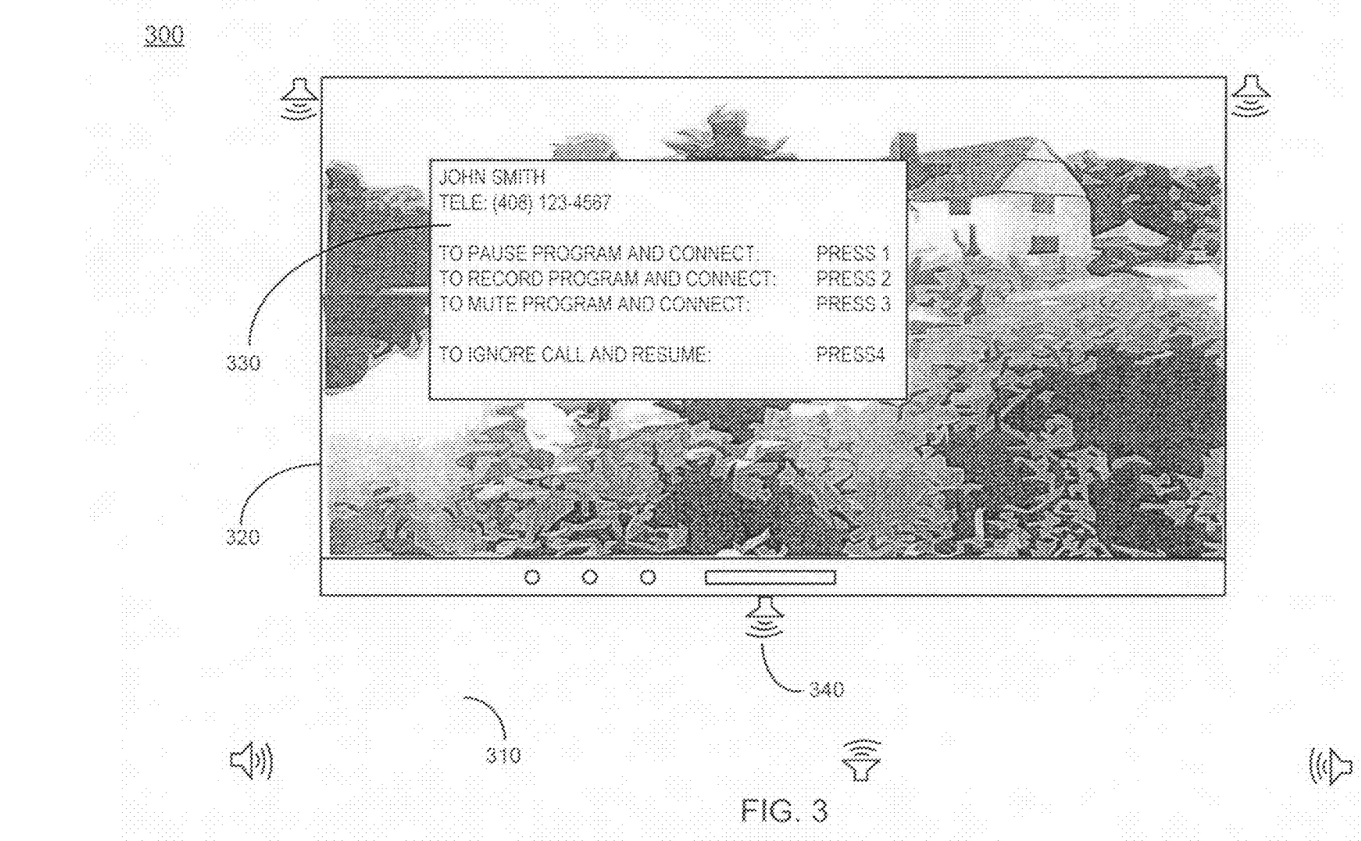
FIG. 3 shows an exemplary diagram involving a telephone call in accordance with one embodiment of the present invention.

Referring now to FIG. 3, an exemplary diagram of a telephone call in accordance with one embodiment of the present invention is shown. A telephone call may be received through the television set 320. In one embodiment, a telephone connection may be facilitated by coupling the television set to a telephone jack. According to one embodiment, a telephone connection may be established using VoIP through the Internet connection of the television set and/or set-top-box, plain old telephone service, video calls or any combination thereof, to name a few.

In this example, the user is watching a movie. In one embodiment, the user is notified of a receipt of a telephone call by ringing (speakers of the television or remote). According to this embodiment, however, the user may be notified of the receipt of a telephone call by displaying a pop-up window message 330 notifying the user.

According to one embodiment, the identity of the caller (e.g., John Smith) is automatically displayed. Moreover, the telephone number of the caller may be displayed. Additionally the user may be given various options. For example, the user may wish to pause the program and answer the telephone call by pressing 1 on a remote control 310. On the other hand, the user may wish to record the program and answer the telephone call by pressing 2 on the remote control 310. In one example, the user may wish to mute the program and answer the telephone call by pressing 3 on the remote control 310. Furthermore, the user may choose to ignore the telephone call and resume watching the movie by pressing 4 on the remote control 310 or by simply doing nothing.

It is appreciated that other means to make a selection may be employed. For example, a voice command may be used to determine what the user wishes to do. As discussed above with regard to FIG. 1, the user may also be notified of a telephone call through the remote control display.

According to one embodiment, the remote control 310 is equipped with an audio output device (e.g., a speaker). As a result, the speaker may be used along with a microphone in order operate as a telephone. However, in one embodiment, the audio output 340 of the television set 320 may be used. It is also appreciated that the television set 320 may be equipped with a microphone, thereby the television set can be used as an audio input device when connected as a telephone.

Figure 4:
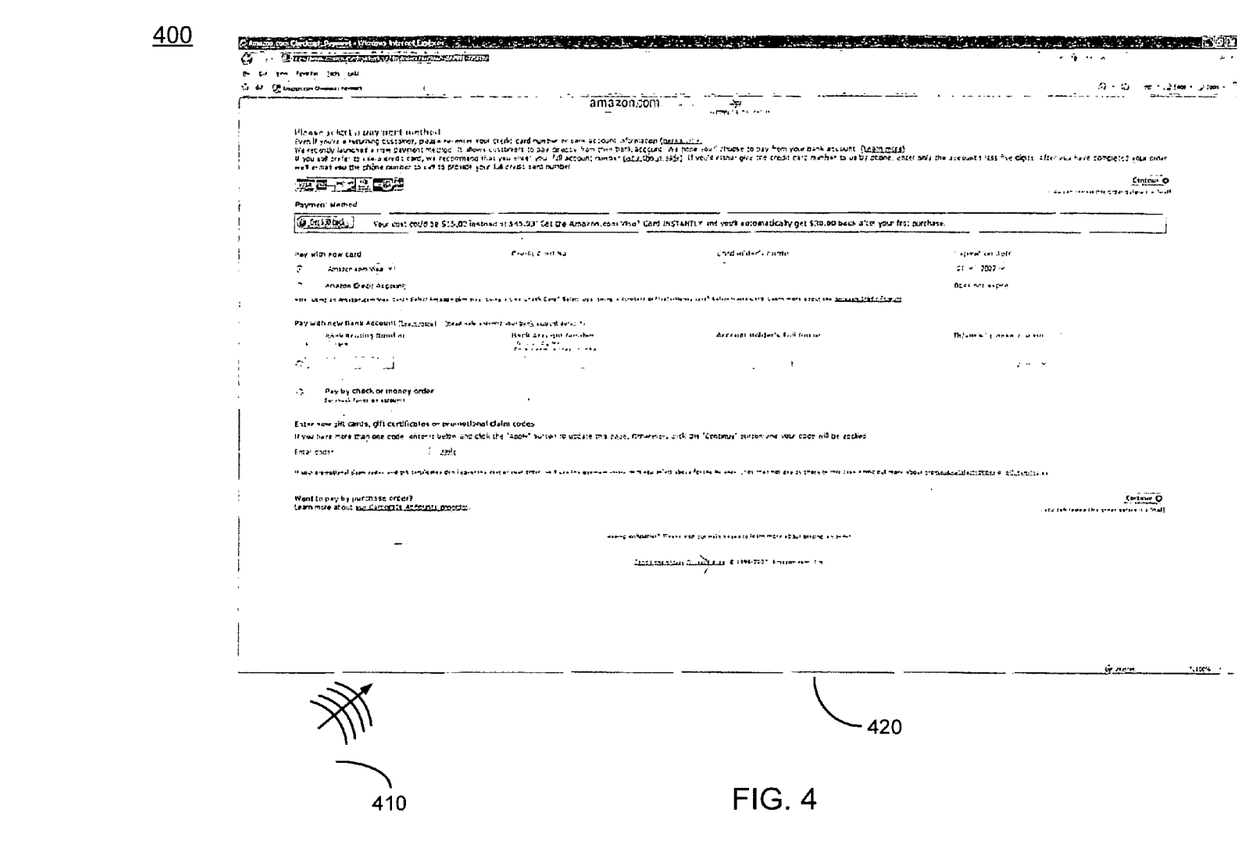
FIG. 4 shows an exemplary system for purchasing an item in accordance with one embodiment of the present invention.

Referring now to FIG. 4, an exemplary system 400 for purchasing an item in accordance with one embodiment of the present invention is shown. In one embodiment of the present invention, a remote control 410 may comprise a reader operable to read and detect information on a prepaid payment card or a credit card when the remote control 410 is in close proximity of the card. It is appreciated, that in one embodiment, the reading is performed in a contactless manner. As a result, the card is read without having to remove the card from a wallet.

In one exemplary embodiment, a user may use the remote control 410 and an Internet equipped television set 420 to browse the Internet. The user may wish to purchase an item on the Internet or purchase a movie through pay view services. Using the reader within the remote control 410, the payment card is read contactlessly and without a need to slide it through a magnetic reading mechanism as done conventionally. The reader may be commonly referred to as a nearfield reader in one example.

Accordingly, when a user wishes to make a purchase in presence of others, the user can avoid revealing the credit card number and additional private information. The information on the card may be read using the nearfield reader and a transaction may be completed without revealing user information. According to one embodiment, once the information is read, the information may be encrypted and sent to the television set 420 for transmission in order to complete the transaction. Encryption may be used in order to prevent an unauthorized user from accessing personal information of the user.

Figure 5A:
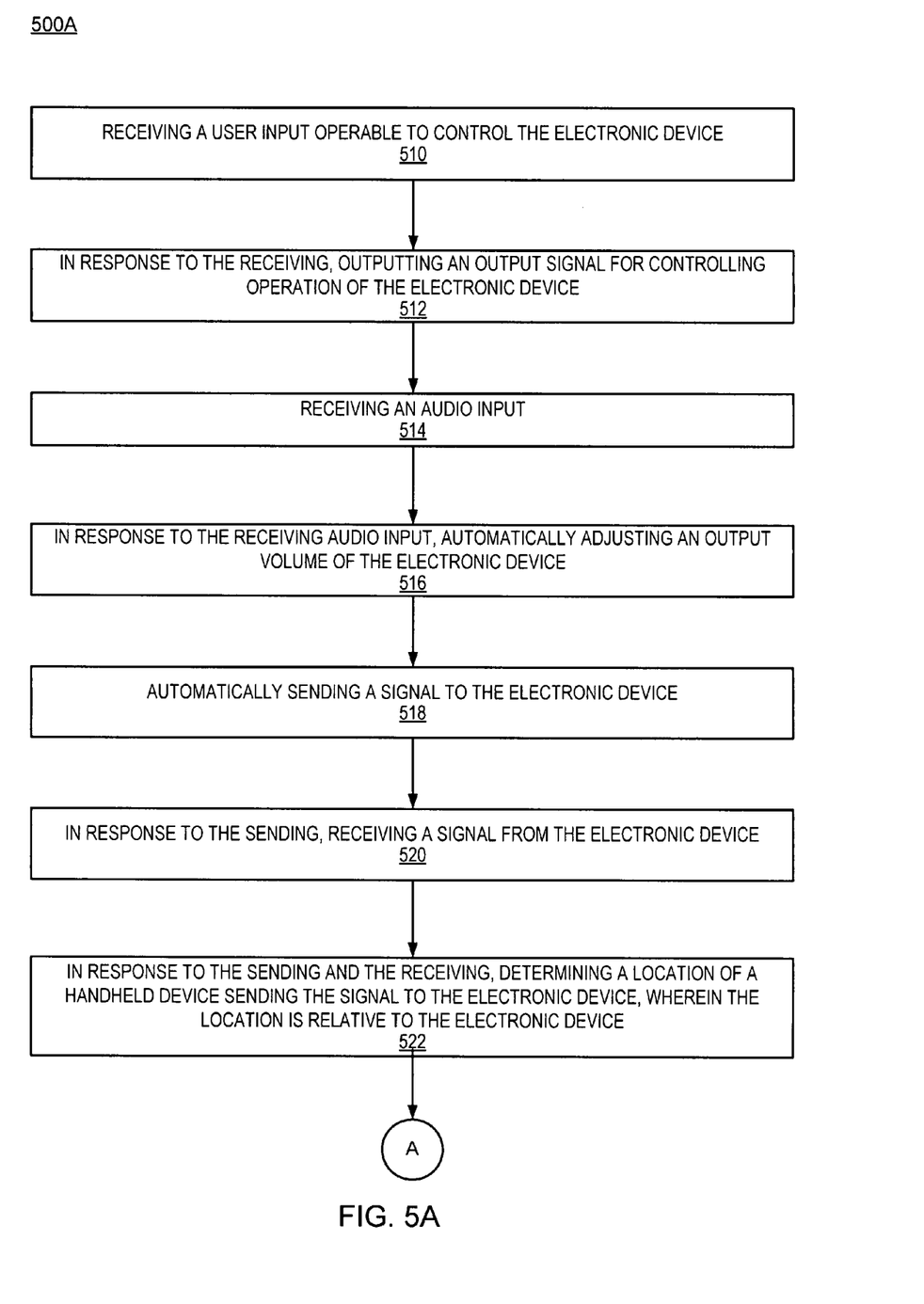
FIGS. 5A, 5B and 5C show an exemplary flow diagram in accordance with one embodiment of the present invention.
Figure 5B:
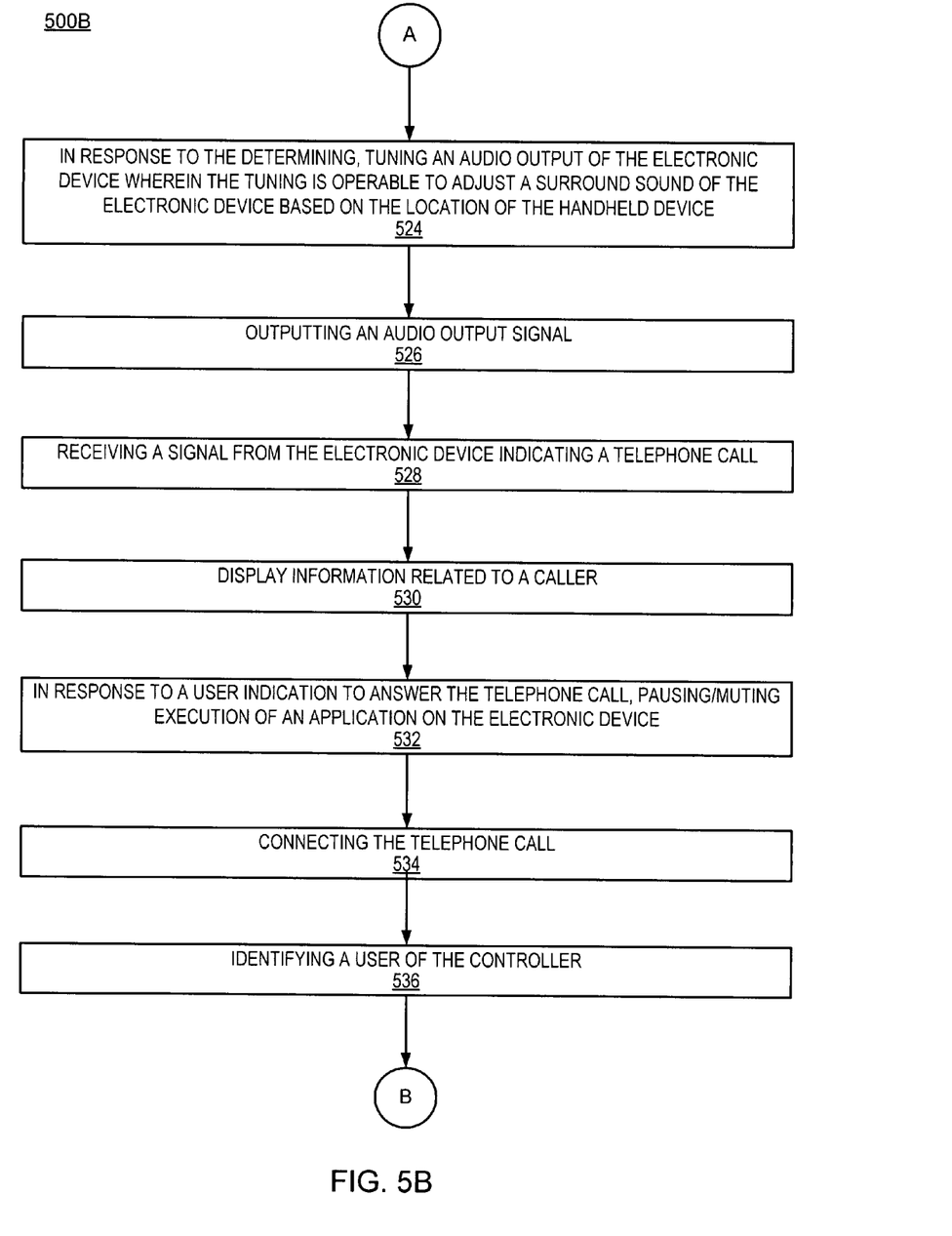
Figure 5C:
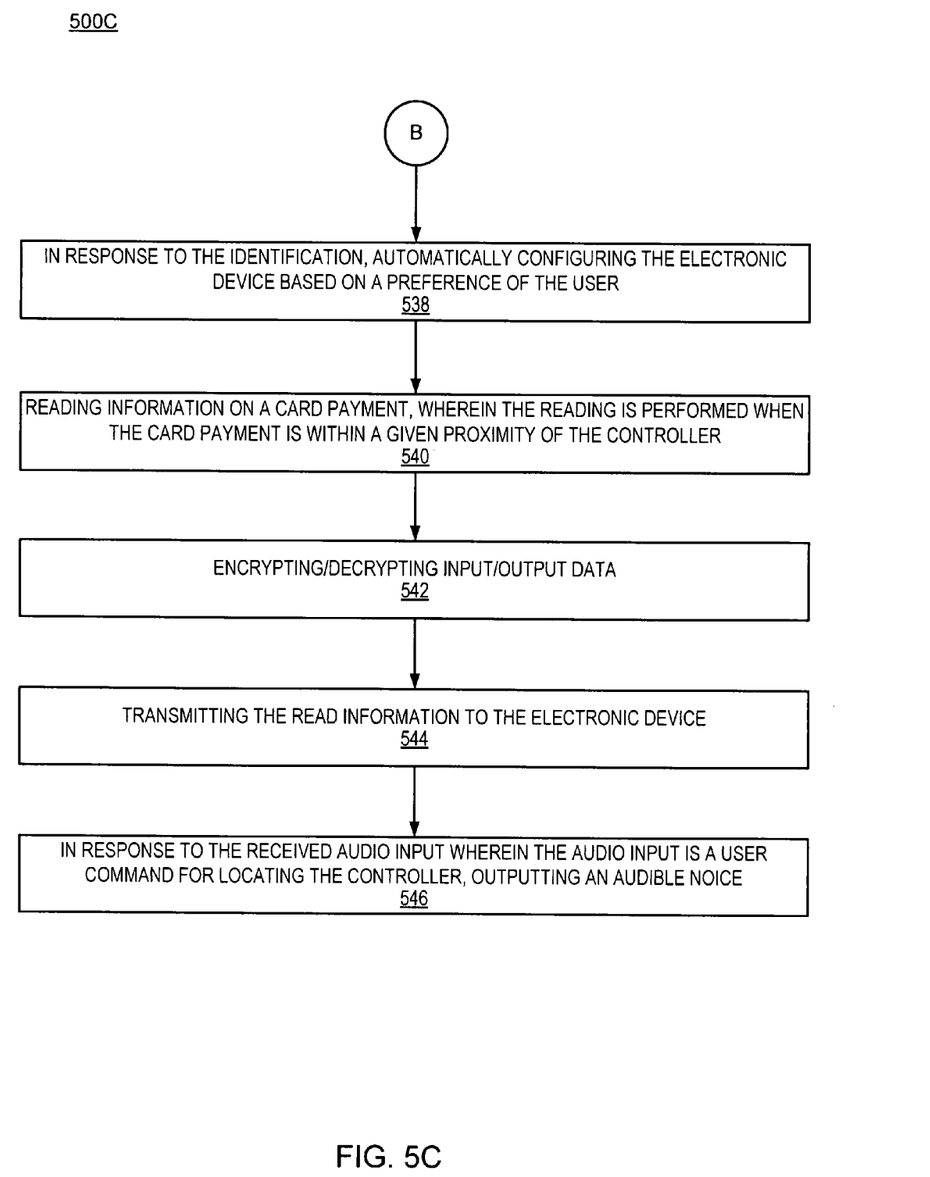

Referring now to FIGS. 5A, 5B and 5C, an exemplary flow diagram in accordance with one embodiment of the present invention is shown. Referring to flow diagram 500A, at step 510 a remote control may receive a user input that is operable to control the electronic device (e.g., television set). For example, the volume of the television set, or the channel of the television set may be changed, to name a few.

It is appreciated that throughout this flow diagram, references are made to a television set. However, it is appreciated that the use of a television set is exemplary and should not be construed as limiting the scope of the present invention. Moreover, it is appreciated that various processing steps as described herein may be performed by the remote control, the television set, other electronic devices (e.g., a set-top-box, receiver, etc.) or any combination thereof.

At step 512, the remote control outputs a signal to the television set in order to control the operation of the television set. The output signal may be IR or radio frequency, to name a few. For example, the remote control may control and configure the surround sound of the television set. According to one embodiment, at step 514 the remote control receives an audio input. The input audio signal may be ambient noise. In one embodiment, the ambient noise may include white noise, pink noise, discrete tones, typically octave or ⅓ octave, spanning the audio range or any combination thereof. As a result, at step 516, the remote control may automatically determine the adjustment of various parameters (e.g., volume) in order to compensate for the ambient noise in order to maintain the effective desired level for parameters (e.g., volume) regardless of external factors (e.g., ambient noise).

At step 518, the remote control may send one or more signals to the television set. At step 520, the remote control receives at least one or more signals from the television set. According to one embodiment, at step 522 the location of the remote control is determined relative to the television set and compared to its location where user preference parameters where originally configured. In one embodiment, the delay of the signal (e.g., sent and received signal) along with directional information of the signal may be used to determine the relative location of the remote control with respect to the television set.

At step 524, in response to determining the location of the remote control, the surround sound of the television set may be automatically adjusted based on the location of the remote control. As such, the surround sound may be automatically configured depending on the location of the remote control.

In one embodiment where the remote control is equipped with an audio output device (e.g., speaker), at step 526 the remote control may output the audio output signal in conjunction with audio output from the television set. Similar to surround sound, the remote control may adjust the volume of the speaker on the remote control based on the location of the remote control relative to the television set.

According to one embodiment, at step 528, a telephone call is received by the remote control through and/or in conjunction with the television set. At step 530 the information of the caller may be displayed. It is appreciated that when the remote control is equipped with a display, the caller information may be displayed on the remote control. The caller information may also be displayed on the television set.

At step 530 and in response to a user selection, a telephone call may be answered and the program on the television set may be paused/muted or recorded. Accordingly, at step 532, the telephone call is connected. Alternatively, the user may wish to ignore the call, in which case the user may simply resume watching the program. It is appreciated that the user selection may be by selecting a button or through voice command or any other means.

According to one embodiment of the present invention, at step 536 the user of the remote control may be identified using biometric information (e.g., finger printing, voice recognition and etc.). At step 538, based on the identification a configuration based on the user preference may be automatically determined. For example, upon determining that user A is using the remote control, the configuration parameters (e.g., volume, surround sound parameters, and etc.) indicating the user preferences for a particular location may be determined. It is appreciated that the user preferences may be setup previously.

Consequently, each time a remote control changes hand from one user to the next, the configuration parameters based on the user preference are automatically changed. Accordingly, the user preference dynamically changes based on the user identification. For example, parents may block certain channels for their children. As a result of detecting that a child is using the remote control, certain channels are blocked, thereby automatically configuring the system based on the identification of the user. As a result, the user no longer needs to manually change the parameters each time to configure and restore the user preference.

At step 540, a nearfield component may be used to read card payment information (e.g., prepaid card, credit card and etc.). The remote control may read the information once the remote is within a given proximity of the card. In one embodiment, the reading is performed without requiring the card to make contact with the remote. As such, the reader operates in a wireless and contactless manner.

In order to protect the user's private information (e.g., user's credit card information), at step 542, the information may be encrypted prior to transmission to the television set. At step 544, the read information may be transmitted to the television set for completing the transaction.

According to one embodiment, at step 546, the remote control responds by outputting an audible noise (e.g., beep, audio output and etc.) in response to a user command indicating that the user is searching for the remote. In one embodiment, the remote control may beep in response to the user snapping. Similarly, in one embodiment, the remote control may output an audio message "here I am" in response to the user voice command "where is the remote?" Accordingly, the remote control may be located by the user without having to physically search for it.

Figure 6:
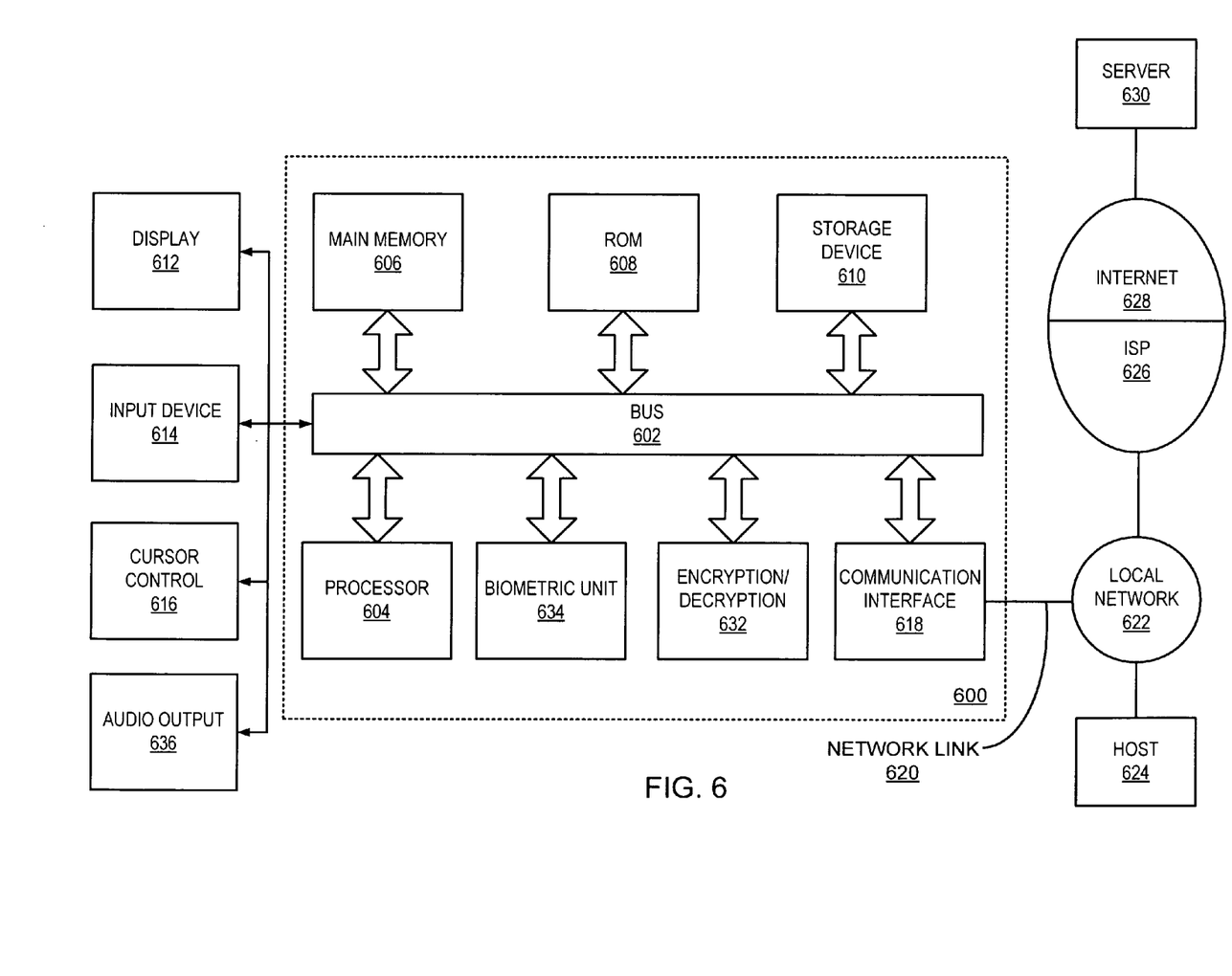
FIG. 6 illustrates a general purpose handheld wireless device that may serve as a platform for controlling electronic devices in accordance with embodiments of the present invention.

FIG. 6 is a block diagram that illustrates a remote control 600 upon which embodiments of the invention may be implemented. Remote control 600 may implement the method for controlling an electronic device as shown in FIGS. 1-5 and includes a bus 602 or other communication mechanism for communicating information, and a processor 604 coupled with bus 602 for processing information.

Remote control 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Remote control 600 further includes a read only memory (ROM) 608 or other static storage device coupled to bus 602 for storing static information and instructions for processor 604. A non-volatile storage device 610 is provided and coupled to bus 602 for storing information and instructions. The remote control 600 may further include an encryption/decryption unit 632, a biometric unit 634 and an audio output 636 as mentioned and discussed above.

Remote control 600 may have coupled via bus 602 to an optional display 612 (e.g., LCD display) for displaying information to a remote control user. An optional input device 614, including alphanumeric and other keys, may be coupled to bus 602 for communicating information and command selections to processor 604. Another type of user input device is navigation button 616, such as a trackball, or cursor direction keys for communicating direction information and command selections to processor 604 and for controlling navigation on display 612.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606.

Remote control 600 can send and receive messages through wireless network(s), network link 620 and communication interface 618. In one embodiment, the communication interface 618 may utilize a radio frequency to transmit data. However, it is appreciated that in one embodiment other transmission means such as an infrared may be used.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A handheld wireless device for controlling an electronic device comprising:
   an audio input device operable to receive an audio input, wherein said audio input is ambient noise;
   an input device operable to receive a first signal from said electronic device in response to a second signal automatically transmitted by an output device of the handheld wireless device to said electronic device, wherein said received first signal indicates a location of said handheld wireless device relative to said electronic device; and
   a processor operable to automatically adjust output volume of said electronic device based on said audio input and said received first signal.

2. The handheld wireless device as described in claim 1, wherein a surround sound system of said electronic device is automatically tuned in response to said location of said handheld wireless device.

3. The handheld wireless device as described in claim 2, wherein said tuning is performed by said processor of said handheld wireless device.

4. The handheld wireless device as described in claim 1, wherein said second transmitted and said first received signals are radio frequency signals.

5. The handheld wireless device as described in claim 1, wherein said input device comprises one or more of: a plurality of soft key buttons, a plurality of mechanical buttons, a rotating input component, a sliding input component, and a voice activation component.

6. The handheld wireless device as described in claim 1 further comprising:
   an audio output device for outputting audio.

7. The handheld wireless device as described in claim 6, operable to function as a wireless telephone and operable to receive a call through said electronic device.

8. The handheld wireless device as described in claim 6, wherein said audio output device in response to said audio input is operable to output an audible noise, wherein said audio input is a user command for locating said handheld wireless device.

9. The handheld wireless device as described in claim 1 operable to function as a telephone and receive calls through said electronic device, and wherein an audio output from a caller is rendered through an output device of said electronic device.

10. The handheld wireless device as described in claim 1 operable to function as a telephone and operable to receive calls through said electronic device, and wherein information related to a caller is displayed on a display of said electronic device.

11. The handheld wireless device as described in claim 1 operable to function as a telephone and in response to receiving a call pauses an execution of an application on said electronic device.

12. The handheld wireless device as described in claim 1 operable to function as a telephone and in response to receiving a call, automatically mutes audio output of said electronic device.

13. The handheld wireless device as described in claim 1, wherein said audio input device comprises a microphone.

14. The handheld wireless device as described in claim 1 further comprising:
   a biometric device, operable to identify a user of said handheld wireless device, wherein said handheld wireless device causes automatic configuration of said electronic device based on a preference of said user.

15. The handheld wireless device as described in claim 1 further comprising:
   a reader, operable to contactlessly detect and read card payment information.

16. The handheld wireless device as described in claim 1 further comprising
   an encryption/decryption unit, operable to encrypt and decrypt input and output data.

17. The handheld wireless device as described in claim 1 further comprising:
   a display, operable to display content and information.

18. The handheld wireless device as described in claim 17 operable to function as a telephone, and wherein information related to a caller is displayed on said display, and wherein said handheld wireless device is operable to receive calls through said electronic device.

19. The handheld wireless device as described in claim 1, wherein said electronic device is a television and said ambient noise is used to automatically determine a volume adjustment of said television in order to compensate for said ambient noise.

20. The handheld wireless device as described in claim 1, comprising:
   an input device further operable to receive a user input; and
   an output device, in response to said received user input, operable to transmit a signal to said electronic device, wherein the transmitted signal controls operation of said electronic device.

21. A remote control implemented method of controlling an electronic device comprising:
    receiving a user input operable to control said electronic device;
    in response to said receiving, outputting an output signal for controlling operation of said electronic device;
    receiving an audio input, wherein said audio input is ambient noise;
    receiving a first signal from said electronic device, wherein said received first signal indicates a location of the remote control with respect to said electronic device; and
    in response to said received audio input and said received first signal, automatically adjusting an output volume of said electronic device.

22. The method as described in claim 21 further comprising:
    automatically sending a second signal to said electronic device;
    in response to said sending, receiving said first signal from said electronic device;
    in response to said sending and said receiving, determining said location of said remote control sending said second signal to said electronic device, wherein said location is relative to said electronic device;
    in response to said determining, tuning an audio output of said electronic device, wherein said tuning is operable to adjust a surround sound of said electronic device based on said location of said remote control.

23. The method as described in claim 21, wherein said output signal is a radio frequency signal.

24. The method as described in claim 21 further comprising:
    outputting an audio output signal.

25. The method as described in claim 21 further comprising:
    receiving a signal from said electronic device indicating a telephone call;
    in response to a user indication to answer said telephone call, pausing execution of an application on said electronic device; and
    connecting said telephone call.

26. The method as described in claim 21 further comprising:
    receiving a signal from said electronic device indicating a telephone call;
    in response to a user indication to answer said telephone call, automatically muting an audio output of said electronic device; and
    connecting said telephone call.

27. The method as described in claim 21 further comprising:
    receiving a signal from said electronic device indicating a telephone call;
    displaying information related to a caller;
    in response to a user indication to answer said telephone call, connecting said telephone call.

28. The method as described in claim 21 further comprising:
    identifying a user of said remote control; and
    in response to said identification, automatically configuring said electronic device based on a preference of said user.

29. The method as described in claim 28, wherein said identification is through voice recognition.

30. The method as described in claim 21 further comprising:
    reading information on a card payment, wherein said reading is performed when said card payment is within a given proximity of said remote control; and
    transmitting said read information to said electronic device.

31. The method as described in claim 21 further comprising:
    encrypting/decrypting input/output data.

32. The method as described in claim 21 further comprising:
    displaying information on said remote control.

33. The method as described in claim 21 further comprising:
    in response to said received audio input wherein said audio input is a user command for locating said remote control, outputting an audible noise.

34. An apparatus for controlling an electronic device comprising:
    one or more processors being operable to:
    receive a user input operable to control said electronic device;
    in response to said receiving, output an output signal for controlling operation of said electronic device;
    receive an audio input, wherein said audio input is ambient noise;
    receive a first signal from said electronic device, wherein said received first signal indicates a location of said apparatus with respect to said electronic device; and
    in response to said receiving audio input and said received first signal, automatically adjust an output volume of said electronic device.

35. The apparatus as described in claim 34, wherein said one or more processors are operable to:
    automatically send a second signal to said electronic device;
    in response to said sending, receive said first signal from said electronic device;
    determine a location of a remote control sending said second signal to said electronic device, wherein said location is relative to said electronic device; and
    tune an audio output of said electronic device, wherein said tuning is operable to adjust a surround sound of said electronic device based on said location of said remote control.

36. The apparatus as described in claim 34, wherein said output signal is a radio frequency signal.

37. The apparatus as described in claim 34, wherein said one or more processors are operable to output an audio output signal.

38. The apparatus as described in claim 34, wherein said one or more processors are operable to:
    receive a signal from said electronic device indicating a telephone call;
    pause execution of an application on said electronic device based on a user indication to answer said telephone call; and
    connect said telephone call.

39. The apparatus as described in claim 34, wherein said one or more processors are operable to:
    receive a signal from said electronic device indicating a telephone call;
    automatically mute an audio output of said electronic device based on a user indication to answer said telephone call; and
    connect said telephone call.

40. The apparatus as described in claim 34, wherein said one or more processors are operable to:
   identify a user; and
   automatically configure said electronic device based on a preference of said user.

41. The apparatus as described in claim 34, wherein said one or more processors are operable to:
   read information on a card payment, wherein said reading is performed when said card payment is within a predefined proximity; and
   transmit said read information to said electronic device.

42. The apparatus as described in claim 34, wherein said one or more processors are operable to output an audible noise in response to said received audio input, wherein said audio input is a user command.

* * * * *